Patented May 14, 1929.

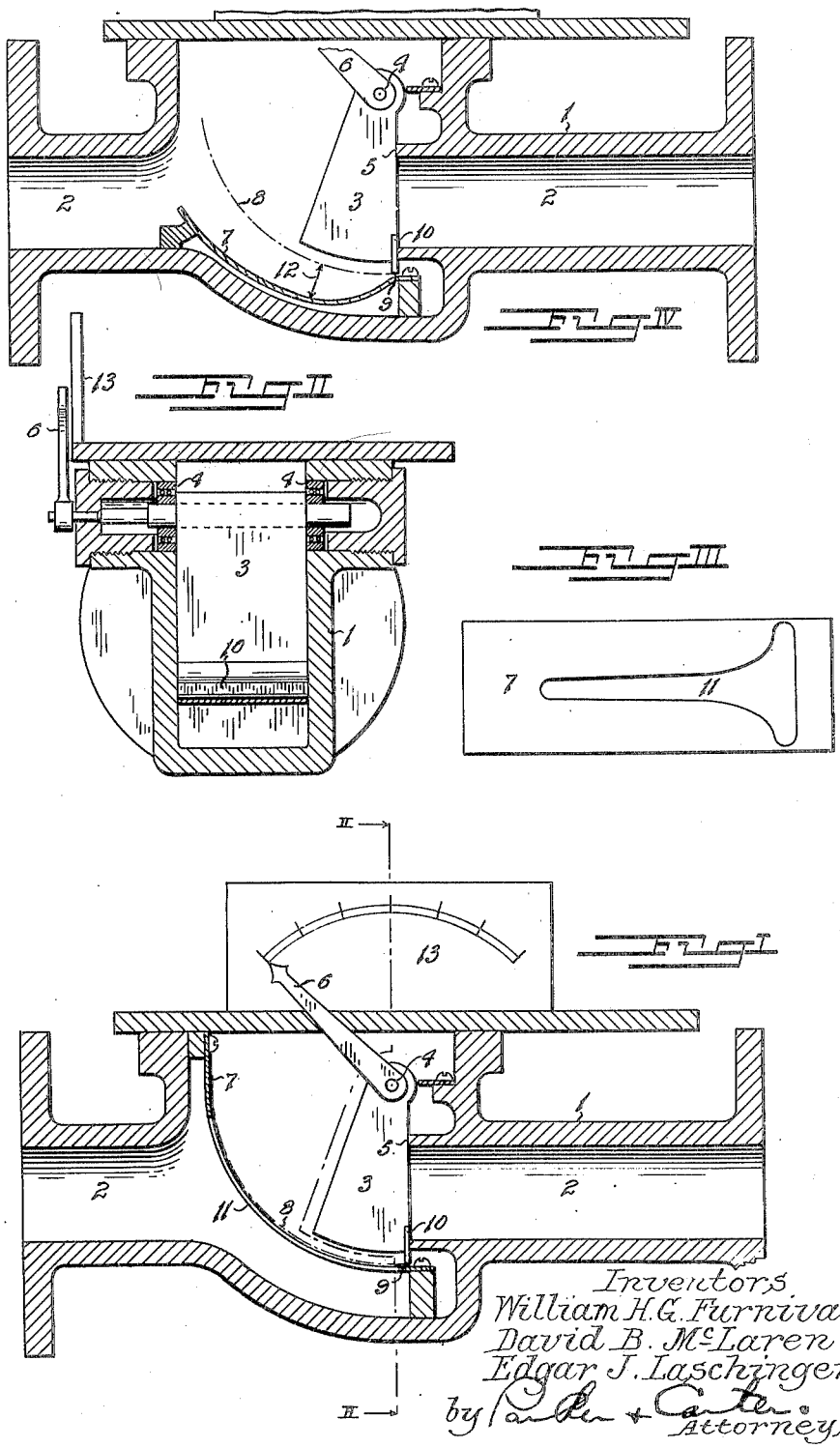

1,712,760

UNITED STATES PATENT OFFICE.

WILLIAM HENRY GRAHAM FURNIVALL, DAVID BERTHA McLAREN, AND EDGAR JACOB LASCHINGER, OF JOHANNESBURG, SOUTH AFRICA.

FLUID METER.

Application filed January 28, 1924, Serial No. 689,160, and in the Union of South Africa November 29, 1923.

The present invention relates to fluid meters. One well known type is the gate meter having a pivoted gate which at no flow hangs down against a seat, and which is swung by the flow of fluid away from the seat and into an unrestricted pipe area. This type of meter is very sensitive at low flows but at high flows the gate movements are inconveniently small in relation to changes of flow.

Another well known type of meter is the orifice type in which the measurement of the flow is derived from the difference of pressure produced by the flow at the two sides of an orifice provided in the pipe. This type of meter is most sensitive at high flows, but is unreliable at low flows.

A purpose of the present invention is to provide a meter having a pivoted gate as above described in which the relationship of gate movement to flow is usefully modified as compared with the ordinary gate meter.

A further purpose is to construct a meter combining the advantages of both the above mentioned types of meters, with the additional advantage of being able automatically to vary the aperture or orifice at different positions of the gate and thus to give accuracy at all rates of flow up to within the limits for which the meter is designed.

The invention is illustrated in the accompanying drawings in which Fig. I is a vertical view, the greater part of which is sectioned on I—I Fig. II.

Fig. II is a vertical section on II—II Fig. I.

Fig. III is a developed plan of the shield Fig. I.

Fig. IV is a view similar to Fig. I, showing a modification.

In the drawings 1 indicates the meter casing providing a fluid passage 2. A gate 3 is pivoted at 4 to hang at no flow against a seat 5.

In the ordinary gate meter the fluid passage extends straight through the casing with the result that there is a great disproportion between the pressure which has to be exerted on the gate to hold it in slightly open position as compared with the pressure required to hold it raised. Flow being proportionate to difference of pressure, equal increments of flow at high flow and low flow respectively produce very unequal gate movements.

Accordingly the indicating hand 6 or other member which is operated by the gate is not as a rule actuated by the gate directly but through interposed mechanism which relatively multiplies the gate movement at high flow and is generally of intricate and delicate construction.

According to this invention means are provided on the outflow side of the gate to produce an orifice which is directly controlled by the gate; such means preferably comprising a shield 7 curved in the direction of the path 8 of the lower end 9 of the gate.

In the construction illustrated in Figs. I, II and III the shield extends over the entire passage on the outflow side of the gate. It also conforms closely to the path of the lower edge of the gate so that leakage between said lower edge and the shield is substantially prevented, the edge 9 conveniently being provided by a machined strip 10. The flow takes place through a slot 11 in the shield which is progressively uncovered as the gate swings up thus providing a variable orifice which can be so shaped as to give the most efficient results for various degrees of opening.

The general shape of the slot is governed by the desired effect of the movement of the gate. The slot shown is designed to make the angular movement of the gate directly proportional to the flow, and is of roughly inverted T shape with the head curving into the stem and the stem tapered from the head.

In the construction shown in Fig. IV the shield is not slotted, but curves away from the path of the edge of the gate; the orifice being that indicated by 12 between the edge 9 of the gate and the shield. In the example shown the orifice is equal at all points to that afforded by the slot 11 of Fig. III.

Applicants have computed the following general formula for calculating the area of the orifice at any position of the gate, which is necessary to cause the displacement, from zero, of the gate in that position, to be directly proportional to the flow of fluid in that position, viz:—

A (orifice area in square inches) =

$$\frac{JM}{cK\sqrt{\sin N}} \quad (1)$$

In this expression M is the value, in degrees, of the actual angular displacement of the gate from its closed position. N is the value, in degrees, of the angular displacement of the centre of gravity of the gate from the vertical line through the axis of the gate. N thus equals M+O, where O is the angle of lead, or in other words the angle through which the centre of gravity of the gate is displaced from the vertical line through the axis of the gate, when the gate is closed. It will be evident from the formula that the essential relationship between the area of the orifice and the angular displacement of the gate is that the area varies directly as angle M and inversely as the square root of sine N.

The factor $c$ represents the co-efficient of discharge for the orifice, and may usually be regarded as a constant. Actually its value varies slightly with the area of the orifice; and when particular accuracy is necessary, it is determined experimentally.

The value of the factor J for the Fig. I construction is found by dividing the maximum desired flow of fluid (measured, in the case of compressed air, in pounds per minute) by the maximum desired displacement of the gate in degrees. The figure thus obtained multiplied by $\frac{180}{\pi}$ gives the value of J for the Fig. I construction.

K is a constant represented by the expression $$K = \sqrt{\frac{2gWLY}{144AD}},$$

in which $g$ = Acceleration due to gravity in feet per second per second.
$W$ = weight of gate in pounds.
$L$ = distance in inches from centre of gate axis to the centre of gravity of the gate.
$Y$ = the specific weight in pounds per cubic foot, of the incoming fluid.
$A$ = the area of the gate in square inches
$D$ = distance in inches from the centre of the gate axis to the centre of area of the gate.

The computation of the general formula (1) is given below; the symbols already explained being use, together with the following $p_1$ = fluid pressure at the incoming side of the gate in lbs. per square inch.
$h = p_1$ less the fluid pressure at the outgoing side of the gate in lbs. per square inch.
$Q$ = fluid flowing in lbs. per second
$R$ = gas constant
$T$ = absolute temperature The known formula for flow through an orifice is $$Q = Ac\sqrt{2gh}\sqrt{\frac{p_1}{RT}} \quad (2)$$

but $$\frac{p_1 144}{RT} =$$

specific weight of the incoming fluid in lbs. per cubic foot to which the symbol Y is assigned above, so that the equation becomes $$Q = Ac\sqrt{\frac{2gY}{144}} \times \sqrt{h} \quad (3)$$

From the known theory of the balance of couples there is derived $$hAD = WL \times \sin N \quad (4)$$

from which $$\sqrt{h} = \sqrt{\frac{WL}{AD}} \times \sqrt{\sin N} \quad (5)$$

Substituting this value of $h$ in equation (3) gives $$Q = Ac\sqrt{\frac{2gY}{144}} \times \sqrt{\frac{WL}{AD}} \times \sqrt{\sin N} \quad (6)$$

Indicating $$\sqrt{\frac{2gWLY}{144AD}}$$

by the symbol K, as explained above, brings the equation to the form $$Q = Ac \times K\sqrt{\sin N} \quad (7)$$

But as it is a condition that the angle of movement M of the gate shall be proportional to the rate of flow Q.

$$Q = JM \quad (8)$$

Equating the two values of Q from 7 and 8 then gives the general formula viz:—

$$A = \text{area in square inches} = \frac{JM}{cK\sqrt{\sin N}}$$

The general equation (1) given above is applicable to either the Fig. I or the Fig. IV construction. From it the orifice areas corresponding to a number of different values of the angle of displacement, M, can be determined and thus the form of the whole orifice can be arrived at.

In practice it is more convenient to use modifications of this formula suitable for the specific form of the invention which is to be constructed. Thus in the Fig. IV form of the invention, the orifice is always a rectangle and its area is B$b$, where $b$ is the breadth and B is the width, both in inches. The expression B$b$ may accordingly be equated to the general expression for area thus $$Bb = \frac{JM}{cK\sqrt{\sin N}} \quad (9)$$

On dividing both sides by $b$, the equation becomes $$B = \frac{JM}{bcK\sqrt{\sin N}} \quad (10)$$

As the breadth of the orifice remains constant in this case, equation (10) gives the values of the varying width B, corresponding to different values of M. By calculating a number of values of B the proper curvature of the shield 7 in Fig. IV is arrived at.

In the case of the Fig. I construction, the variable to be calculated is the width $t$ of the slot 11 for the different values of M. An equation (15 below) for this purpose is obtained as follows, using a new factor F which represents the distance, in inches, from the axis of the gate to the free edge of the same.

The general equation $$A = \frac{JM}{cK\sqrt{\sin N}} \quad (1)$$

is used, but for convenience of calculation the angles M and N are expressed in terms of arc to radius unity.

Differentiating:—

$$dA = \frac{J}{cK} d\left(\frac{M}{\sqrt{\sin N}}\right) \quad (11)$$

Since $$d\frac{M}{\sqrt{\sin N}} = \frac{\sqrt{\sin N}\, dM - M\, d\sqrt{\sin N}}{\sin N}$$

and $$d\sqrt{\sin N} = \frac{d(\sin N)}{2\sqrt{\sin N}}$$

formula (11) becomes $$dA = \frac{J}{2cK\sqrt{\sin N}} (2dM - M \cot N\, dN) \quad (12)$$

Since $N = (M + O)$ and $O$ is constant $$dN = dM \quad (13)$$

In terms of its width $t$ and the factor F, the area of the slot in Fig. I is given by $$A = \int tF\, dM$$

so that $$dA = tF\, dM \quad (14)$$

Combining equations 12, 13 and 14 and converting, so as to express M in degrees, gives:—

$$t\,(\text{in inches}) = \frac{J}{2cFK\sqrt{\sin N}}\left(2 - \frac{\pi M}{180}\cot N\right) \quad (15)$$

By calculating the width $t$ for a number of different angles M, the form of the slot 11 is obtained.

As a result of the above described constructions, an indicating hand 6 or the like may be secured directly to the gate pivot and co-operate with the dial 13, a chart or the like, the divisions of which are spaced equally or at least without inconvenient variation. Moreover if the gate movement is to be integrated, the construction of the integrating mechanism is simplified.

We claim:

In a fluid meter, the combination of a casing providing an enclosed fluid passage, a heavy gate pivoted above the passage to hang at no flow across the passage and so as to be swung upwards by the flowing fluid, the gate resisting the flow solely by its weight, and a shield curved upwardly in the general direction of the path of the lower edge of the gate and providing with said edge an orifice such that the flow of fluid through it is directly proportionate to the angular displacement of the gate from its no flow position.

Signed at Johannesburg, Transvaal Province, Union of South Africa, this 19th day of December, 1923.

WILLIAM HENRY GRAHAM FURNIVALL.
DAVID BERTHA McLAREN.
EDGAR JACOB LASCHINGER.